United States Patent Office
3,412,108
Patented Nov. 19, 1968

1

3,412,108
A-HOMO-Δ¹(10),2,4a(5)-ESTRATRIEN-4-ONES
AND THEIR PREPARATION
Arthur J. Birch, Manchester, England, assignor to
Syntex Corporation, Panama, Panama, a corporation of Panama
No Drawing. Continuation-in-part of application Ser. No.
302,718, Aug. 16, 1963. This application Mar. 7, 1966,
Ser. No. 532,060
Claims priority, application Mexico, Feb. 14, 1963,
70,907
20 Claims. (Cl. 260—345.9)

ABSTRACT OF THE DISCLOSURE

A-homo-Δ¹(10),2,4a(5)-estratrien-4-one steroids having a keto group at C-17 or hydroxy, acyloxy, tetrahydrofuranyloxy, or tetrahydropyranyloxy at C-17β and hydrogen, lower alkyl, lower alkenyl, or lower alkynyl at C-17α which compounds are useful as anabolic agents having anti-gonadotrophic and anti-fibrillatory properties and in fertility control, lowering of blood cholesterol levels, relieving premenstrual tension, and diminishing the output of the pituitary gland and the preparation of such compounds.

This application is a continuation-in-part of my co-pending U.S. patent application Ser. No. 302,718, filed Aug. 16, 1963, now abandoned.

This invention relates to novel cyclopentanopolyhydrophenanthrene derivatives and to processes for the preparation thereof.

More particularly, this invention relates to novel A-homo-Δ¹(10),2,4a(5)-estratrien-4-ones represented by the general formula:

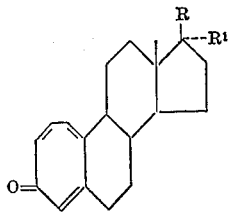

In the above formula, R represents a hydroxyl group, an acyloxy group, a tetrahydrofuranyloxy group or a tetrahydropyranyloxy group, R' represents hydrogen, a lower alkyl group, such as methyl, ethyl, propyl, and the like, a lower alkenyl (including halo-lower alkenyl) group, such as vinyl, trifluorovinyl, 3-fluoropropenyl, 3,3,-3-trifluoropropenyl, and the like or a lower alkynyl (including halo-lower alkynyl, hydroxypropynyl and acyloxypropynyl) group, such as ethynyl, chloroethynyl, bromoethynyl, propynyl, monofluoropropynyl, trifluoropropynyl, butynyl, hexynyl, and the like, and R and R' taken together represent a keto group.

The acyloxy and acyl groups referred to herein are preferably derived from hydrocarbon carboxylic acids containing less than 12 carbon atoms. These acids can be saturated or unsaturated (including aromatic), and can be straight-chain, branched, or cyclic-aliphatic. In addition, they can be unsubstituted or substituted with functional groups such as hydroxyl groups, alkoxy groups containing up to 6 carbon atoms, inclusive, acyloxy groups containing up to 12 carbon atoms inclusive, nitro groups, amino groups or halogen atoms. Included among such ester groups are the acetate trimethyl-acetate, t-butylacetate, phenoxyacetate, aminoacetate, propionate, cyclopentylpropionate, β-chloropropionate, enanthate, adamantoate and benzoate groups.

2

The compounds represented by the above formula are anabolic agents which also have anti-gonadotrophic and anti-fibrillatory properties. In addition, they are useful in fertility control, lower blood cholesterol levels, relieve premenstrual tension and diminish the output of the pituitary gland.

The compounds represented by the above formula, wherein R' is other than hydroxypropynyl or acyloxypropynyl, are prepared by a process illustrated by the following equation:

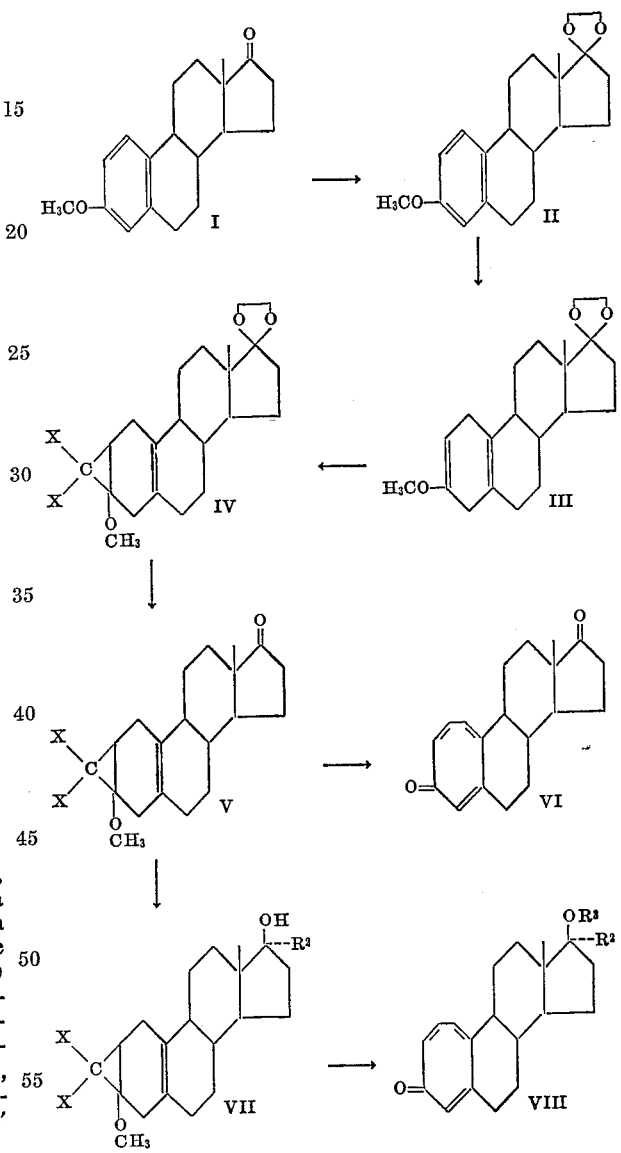

In the above formulas, $R^2$ represents hydrogen, a lower alkyl group, a lower alkenyl group or a lower alkynyl group other than hydroxypropynyl and acyloxypropynyl, $R_3$ represents hydrogen, an acyl group, a tetrahydrofuranyl group or a tetrahydropyranyl group, and X represents a halogen, i.e., fluorine, chlorine, bromine or iodine.

In practicing the process outlined above, the starting material I, a 3-lower alkyl ether of estrone, e.g., estrone 3-methyl ether, is ketalized in known manner, as by using a lower alkylene glycol such as ethylene glycol, propylene glycol, or the like, in the presence of a catalytic amount of a strong acid, such as p-toluene sulfonic acid or the like, to give the corresponding 17-ketal II, e.g., 17-cycloethylenedioxy-3-methoxy-Δ¹,³,⁵(10)-estratriene. The 17-ketal, dissolved in an ether such as diethyl ether or the like, is then treated with metallic lithium in liquid ammonia, under anhydrous conditions at room temperature to give the corresponding $\Delta^{2,5(10)}$-diene III, e.g., 17-cycloethylenedioxy-3-methoxy-$\Delta^{2,5(10)}$-estradiene.

The thus-obtained $\Delta^{2,5(10)}$-diene, dissolved in an inert organic solvent, e.g., an ether such as diethyl ether, dioxane or tetrahydrofuran, an aromatic hydrocarbon such as benzene, toluene or xylene, or the like, as well as mixtures thereof, containing potassium t-butoxide, is reacted at a temperature of from about $-20°$ C. to about room temperature, with stirring, for from about 1 to about 12 hours under substantially anhydrous conditions in an inert nitrogen atmosphere, with a dihalocarbene, i.e., difluorocarbene, dichlorocarbene, which can be prepared by thermal decomposition of the sodium salt of chlorodifluoroacetic or trichloroacetic acid, respectively, or difromocarbene or diiodocarbene, which can be prepared in situ by the addition of bromoform or iodoform, respectively, to the reaction mixture, thus giving the corresponding 2,3-dihalomethylene intermediate IV, e.g., 17-cycloethylenedioxy - 2,3-dibromomethylene-3-methoxy-$\Delta^{5(10)}$-estrene (IV; X=bromine).

The 17-ketal group in this 2,3-dihalomethylene intermediate is then hydrolyzed in known manner, e.g., using hydrochloric acid, oxalic acid, or the like, to give the corresponding 17-keto steroid V, e.g., 2,3-dibromomethylene-3-methoxy-$\Delta^{5(10)}$-estren-17-one (V; X=bromine).

By reacting the 17-keto steroid with a silver salt, preferably one which is soluble in water, such as silver nitrate, silver perchlorate, silver acetate, and the like, in water, preferably in the presence of a water-miscible organic solvent, e.g., a lower alkanol such as methanol or ethanol, a ketone such as acetone, or the like, as well as mixtures thereof, at reflux temperature for from about 25 minutes to about 3 hours, A-homo-$\Delta^{1(10),2,4a(5)}$-estratrien-4,17-dione (VI) is obtained. Where the dihalocarbene adduct V reacts only sluggishly with silver ion, it can be exposed to boiling pyridine for about 1 hour prior to reaction with the silver salt.

Where a 17α-unsubstituted-17β-hydroxy final product is desired, the 17-keto steroid V is reduced, preferably using sodium borohydride in tetrahydrofuran-methanol, or the like, at room temperature for about 12 hours or longer, thus giving the 17α-unsubstituted-17β-ol VII, e.g., 2,3-dibromomethylene - 3 - methoxy-$\Delta^{5(10)}$-estren-17β-ol (VII; $R^2$=hydrogen, X=bromine), which is then treated with a silver salt in water in the manner described hereinabove to give A-homo-$\Delta^{1(10),2,4a(5)}$-estratrien-17β-ol-4-one (VIII; $R^2$ and $R^3$=hydrogen).

The corresponding 17-esters are prepared in known manner by reacting the 17α-unsubstituted-17β-ol (VIII) with an acyl anhydride or chloride in pyridine at room temperature overnight. Thus, for example, by reacting A-homo-$\Delta^{1(10),2,4a(5)}$-estratrien-17β-ol-4-one with acetic anhydride in pyridine at room temperature overnight, A-homo-$\Delta^{1(10),2,4a(5)}$-estratrien - 17β - ol-4-one 17 acetate (VIII; $R^2$=hydrogen, $R^3$=acetyl) is obtained.

Similarly, the 17α-unsubstituted-17β-ol VIII (or a 17α-substituted-17β-ol VIII wherein $R^2 \ne$ hydrogen) can be etherified with dihydrofuran or dihydropyran by reaction in benzene under substantially anhydrous conditions, in the presence of an acidic catalyst, e.g., p-toluenesulfonic acid, boron trifluoride etherate, or the like, preferably at from about room temperature to about 50° C. for from about 1 to about 72 hours, thus giving the corresponding 17β-tetrahydrofuranyloxyl or 17β-tetrahydropyranyloxy steroid VIII, e.g., A-homo-17β-tetrahydropyanyloxy-$\Delta^{1(10),2,4a(5)}$-estratrien-4-one (VIII; $R^2$=hydrogen, $R^3$=tetrahydropyranyl).

Where 17α-lower alkyl, 17α-lower alkenyl (including halo-lower alkenyl) and 17α-lower alkynyl-17β-hydroxy final products are desired, the 17-keto steroid V can be reacted at reflux temperature in an inert organic solvent, preferably thiophene-free benzene, under susbtantially anhydrous conditions for about 3 hours or longer, with a lower alkyl, alkenyl or alkynyl magnesium halide, such as methylmagnesium bromide, vinylmagnesium bromide, trifluorovinylmagnesium bromide, ethynylmagnesium bromide, or the like, to produce the corresponding 17α-lower alkyl, -lower alkenyl or -lower alkynyl-17β-hydroxy derivative VII, e.g., 2,3-dibromomethylene-3-methoxy-17α-methyl-$\Delta^{5(10)}$-estren-17β-ol (VII; $R^2$=methyl, X=bromine), which is then treated with a silver salt in water in the manner described hereinabove to give the corresponding A-homo-$\Delta^{1(10),2,4a(5)}$-4-one VIII, e.g., A-homo-17α - methyl-$\Delta^{1(10),2,4a,(5)}$-estratrien-17β-ol-4-one (VIII; $R^2$=methyl, $R^3$=hydrogen).

Similarly, the 17-keto steroid V can be converted to the corresponding 17α-lower alkyl, -lower alkenyl or -lower alkynyl-17β-ol VII by reacting it with a lower alkyl, alkenyl or alkynyl lithium compound in absolute diethyl ether under an inert nitrogen atmosphere at room temperature for 48 hours or longer. The 17-keto steroid V, dissolved in anhydrous benzene containing potassium t-amylate, can also be reacted with gaseous acetylene under an inert nitrogen atmosphere at room temperature for 36 hours or longer to give the corresponding 17α-ethynyl-17β-hydroxy steroid VII. Hydrogenation of this compound or the corresponding A-homo steroid by known means, e.g., using gaseous hydrogen and a suspension of pre-hydrogenated 2% palladium-on-calcium carbonate hydrogenation catalyst in pyridine at room temperature and atmospheric pressure until approximately 1.1 molar equivalents of hydrogen are absorbed for partial hydrogenation or gaseous hydrogen and a suspension of pre-hydrogenated 10% palladium-on-charcoal hydrogenation catalyst in dioxane at room temperature and atmospheric pressure until two molecular equivalents of hydrogen are absorbed for complete hydrogenation, gives the corresponding 17α-vinyl or 17α-ethyl derivative.

Where 17α-halo-lower alkynyl-17β-hydroxy final products are desired, the halo-lower alkynyl substituent can be introduced in many cases by first slowly mixing a polyhaloalkene of the general formula:

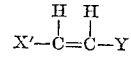

wherein X′ represents chlorine or bromine and Y represents chlorine, bromine or trifluoromethyl, such as 1,2-dichloroethylene, 1,2-dibromoethylene, 1-chloro-3,3,3-trifluoropropyl-1-ene, or the like, in anhydrous diethyl ether under an inert nitrogen atmosphere at 0° C., with a solution of methyl lithium in anhydrous diethyl ether (prepared, for example, by adding lithium to methyliodide in anhydrous diethyl ether solution under an inert nitrogen atmosphere at about 10° C.), then holding the resulting reaction mixture at room temperature, with stirring, for from about 90 minutes to about 2 hours, thus giving the corresponding halo-lower alkynyllithium reagent. Next, the 17-keto steroid V is slowly added and the resulting reaction mixture is held at room temperature for from about 12 hours to about 18 hours to give the corresponding 17α-halo-lower alkynyl derivative VII. Where 1,2-dichloroethylene, 1,2-dibromoethylene and 1-chloro-3,3,3-trifluoropropyl-1-ene, respectively, are used, 17α-chloroethynyl; 17α-bromoethynyl and 17α-trifluoropropynyl substituents, respectively, are introduced, and the resulting 2,3-dihalomethylene - 17α - halo-lower alkynyl-3-methoxy-$\Delta^{5(10)}$-estren-17β-ol, when treated with a silver salt in water in the manner described hereinabove, gives the corresponding A-homo steroid VIII. Finally, A-homo-17α-trifluoropropynyl - $\Delta^{1(10),2,4a(5)}$ - estratrien - 17β - ol - 4 - one (VIII; $R^2$=trifluoropropynyl, $R^3$=hydrogen) can be partially hydrogenated, if desired, in the manner described hereinabove, to give A-homo-17α-(3′,3′,3′-trifluoropropenyl)-$\Delta^{1(10),2,4a(5)}$-estratrien-17β-ol-4-one (VIII; $R^2$=3,3,3,-trifluoropropenyl, $R^3$=hydrogen).

The 17-esters of the 17α-substituted-17β-ols of the present invention can be prepared in known manner, e.g., by reaction at room temperature for 24 hours or longer under substantially anhydrous conditions with a mixture of an acyl anhydride and the corresponding acid in the presence of a catalytic amount of p-toluenesulfonic acid. Thus, for example, by reacting A-homo-17α-methyl-Δ$^{1(10),2,4a(5)}$-estratrien-17β-ol-4-one under these conditions with a mixture of acetic anhydride and acetic acid, the corresponding 17-acetate (VIII; $R^2$=methyl, $R^3$=acetyl) is obtained.

Certain of the 17α-halo-lower alkynyl steroids, as well as the corresponding 17α-hydroxypropynyl and -acyloxypropynyl steroids of the present invention can be prepared by processes illustrated by the following equations:

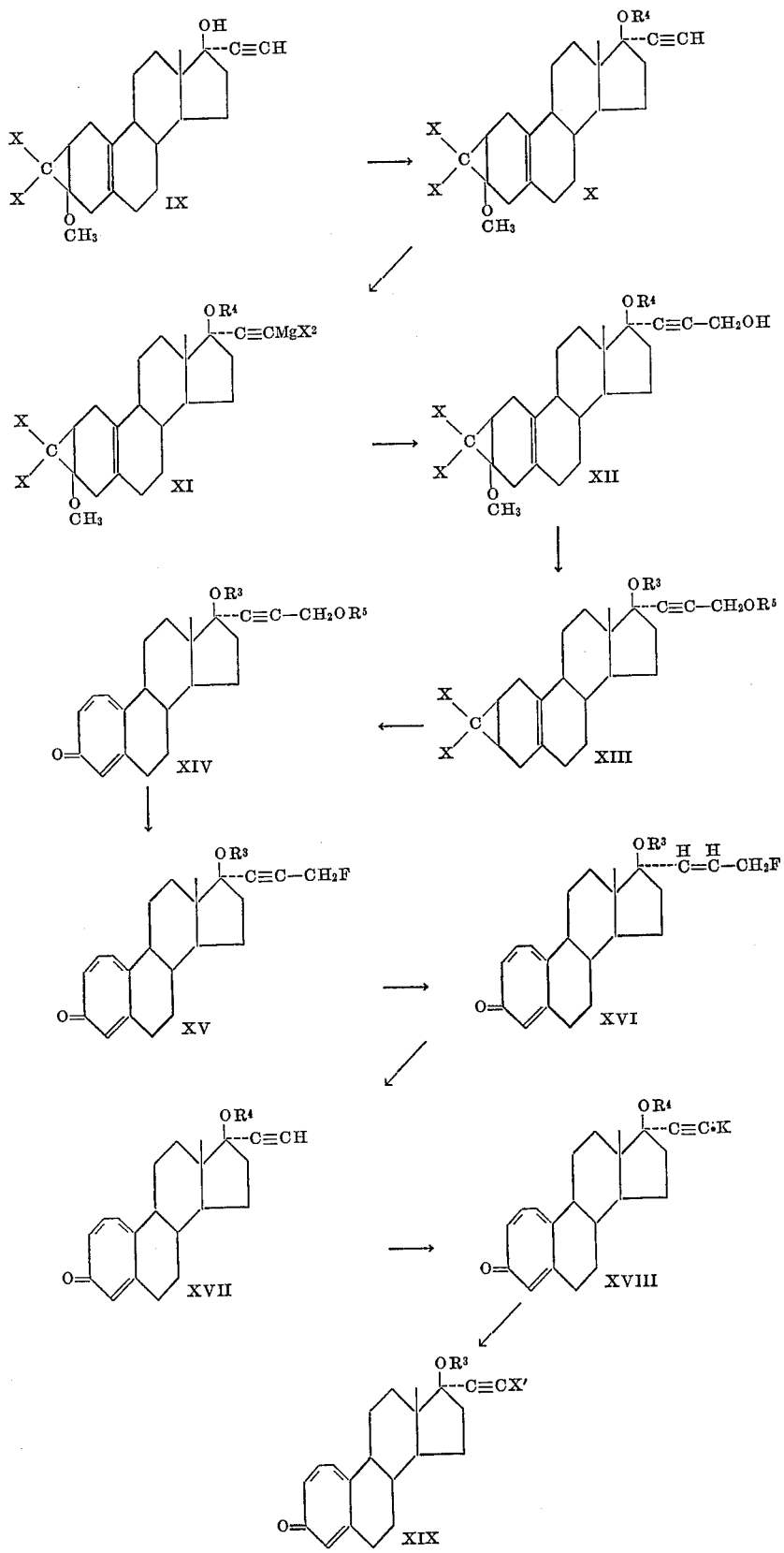

In the above formulas R³, X and X' have the same meanings as set forth hereinabove, R⁴ represents a tetrahydrofuranyl group or a tetrahydropyranyl group, R⁵ represents hydrogen or an acyl group and X² represents chlorine, bromine or iodine.

In carrying out the first of these processes, the starting material IX, e.g., 2,3-dibromomethylene-17α-ethynyl-3-methoxy-$\Delta^{5(10)}$-estren-17β-ol (IX; X=bromine), prepared as described hereinabove, is reacted with dihydrofuran or dihydropyran in the manner described hereinabove to give the corresponding 17-ether X, e.g., 2,3-dibromomethylene-17α - ethynyl - 3 - methoxy - 17β - tetrahydropyranyloxy-$\Delta^{5(10)}$-estrene (X; R⁴=tetrahydropyranyl, X=bromine).

A Grignard interchange is then effected between the ethynyl group in this 17-ether and a lower alkylmagnesium halide, such as methylmagnesium chloride, ethylmagnesium bromide, or the like, thus giving the corresponding 17α-lower alkynylmagnesium halide intermediate XI, e.g., 2,3-dibromomethylene-17α-ethynylmagnesium bromide-3-methoxy-17β - tetrahydropyranyloxy - $\Delta^{5(10)}$ - estrene (XI; R⁴=tetrahydropyranyl, X and X²=bromine). This reaction can be accomplished in known manner, e.g., by reacting the 17-ether and the lower alkylmagnesium halide under substantially anhydrous conditions at reflux temperature in an ether such as tetrahydrofuran, diethyl ether, or the like, as well as mixtures thereof, for about 6 hours or longer.

The thus-obtained 17α-lower alkynylmagnesium halide intermediate, in the solvent in which it was prepared, is then reacted at a temperature of from about 0° C. to about 40° C., under an inert nitrogen atmosphere, with gaseous formaldehyde to give the corresponding 17α-hydroxypropynyl devivative XII, e.g., 2,3-dibromomethylene - 17α - hydroxypropynyl - 3 - methoxy-17β-tetrahydropyranyloxy - $\Delta^{5(10)}$ - estrene (XII; R⁴=tetrahydropyranyl, X=bromine), which can be obtained from the reaction mixture as such or hydrolyzed with strong acid, e.g., concentrated hydrochloric acid or the like, to give the free 17β-ol XIII, e.g., 2,3-dibromomethylene-17α-hydroxypropynyl-3-methoxy-$\Delta^{5(10)}$-estren-17β-ol (XIII; R³ and R⁵=hydrogen, X=bromine).

Esterification of the thus-obtained 17α-hydroxypropynyl-17β-tetrahydrofuranyloxy or -tetrahydropyranyloxy steroid with an acyl anhydride in pyridine in the manner described hereinabove gives the corresponding 17α-acyloxypropynyl-17β-tetrahydrofuranyloxy or -tetrahydropyranyloxy derivative XIII, e.g., 17α-acetoxypropynyl-2,3-dibromomethylene-3-methoxy - 17β - tetrahydropyranyloxy-$\Delta^{5(10)}$-estrene (XIII; R³=tetrahydropyranyl, R⁵=acetyl, X=bromine), which can then be treated with strong acid, if desired, to give the corresponding 17α-acyloxypropynyl-17β-hydroxy derivative XIII, e.g., 17α-acetoxypropynyl-2,3-dibromomethylene - 3 - methoxy - $\Delta^{5(10)}$-estren-17β-ol (XIII; R³=hydrogen, R⁵=acetyl, X=bromine).

Similarly, esterification of either the 17α-hydroxypropynyl-17β-ol XIII or the corresponding 17α-acyloxypropynyl-17β-ol with a mixture of an acyl anhydride and the corresponding acid in the manner described hereinabove gives the corresponding 17α-acyloxypropynyl-17β-acyloxy derivative XIII, e.g., 17α-acetoxypropynyl-2,3-dibromomethylene-3-methoxy-$\Delta^{5(10)}$-estren-17β-ol 17-acetate (XIII; R³ and R⁵=acetyl, X=bromine), which can then be partially hydrolyzed, if desired, in known manner, e.g., using a boiling 1-5% solution of sodium or potassium bicarbonate in aqueous methanol at a temperature of from about 0° C. to about 20° C. for from about 1 hour to about 18 hours, to give the corresponding 17α-hydroxypropynyl-17β-acyloxy derivative XIII, e.g., 2,3-dibromomethylene - 17α - hydroxypropynyl - 3 - methoxy - $\Delta^{5(10)}$-estren-17β-ol (XIII; R³=hydrogen, R⁵=acetyl, X=bromine).

By treating the 17α-hydroxypropynyl-17β-ol XIII, or its ethers or esters, with a silver salt in water in the manner described hereinabove, the corresponding A-homo steroid XIV, e.g., A-homo-17α-hydroxypropynyl-$\Delta^{1(10),2,4a(5)}$-estratrien-17β-ol-4-one (XIV; R³ and R⁵=hydrogen), or an ether or ester thereof, is obtained.

An A-homo steroid XIV having a 17β-acyloxy, tetrahydrofuranyloxy or tetrahydropyranyloxy group can then be reacted with from about 1 to 1.5 molar equivalents of 2-chloro-1,1,2-trifluorotriethylamine or the like in an inert organic solvent, e.g., acetonitrile, an ether such as diethyl ether, diisopropyl ether, dioxane or tetrahydrofuran, an aromatic hydrocarbon such as benzene, toluene or xylene, and the like, as well as mixtures thereof, at a temperature of from about room temperature to reflux temperature for from about 30 minutes to about 24 hours to give the corresponding 17α-monofluoropropynyl derivative XV, e.g., A-homo-17α-monofluoropropynyl - $\Delta^{1(10),2,4a(5)}$-estratrien-17β-ol-4-one 17-acetate (XV; R³=acetyl).

The thus-prepared 17α - monofluoropropynyl - 17β-acyloxy steroid can be hydrolyzed to the corresponding free 17β-ol in known manner, e.g., using a boiling 1-5% solution of sodium or potassium hydroxide in aqueous methanol under an inert nitrogen atmosphere, and the corresponding 17-ethers can also be hydrolyzed to the free 17β-ols in the manner described hereinabove.

A 17α-monofluoropropynyl steroid XV can also be partially hydrogenated, if desired, in the manner described hereinabove, to give the corresponding 17α-(3'-monofluoropropenyl) derivative XVI, e.g., A-homo-17α-(3'-monofluoropropenyl) - $\Delta^{1(10),2,4a(5)}$ - estratrien-17β-ol-4-one (XVI; R³=hydrogen).

In the preparation of 17α-haloethynyl derivatives, the starting material XVII, e.g., A-homo-17α-ethynyl-17β-tetrahydropyranyloxy-$\Delta^{1(10),2,4a(5)}$-estratrien-4-one (XVII; R⁴=tetrahydropyranyl), prepared as described hereinabove, is reacted with potassium t-batoxide in t-butanol at a temperature of from about 10° C. to about 40° C. for from about 1 to 24 hours to give the corresponding 17α-ethynylpotassium intermediate XVII.

Where the 17α-chloroethynyl derivative XIX is desired, t-butyl hypochlorite, N-chlorosuccinimide, or the like is added to the solution of the 17α-ethynylpotassium intermediate and the resulting mixture is reacted at a temperature of from about 10° C. to about 40° C. for from about 1 to about 24 hours, thus giving A-homo-17α-chloroethynyl - 17β - tetrahydropyranyloxy - $\Delta^{1(10),2,4a(5)}$ - estratrien-4-one (XIX; R³=tetrahydropyranyl, X'=chlorine).

Similarly, where the 17α-bromoethynyl derivative is desired, N-bromosuccinimide or the like is added to the solution of the 17α-ethynylpotassium intermediate and the resulting mixture is reacted at a temperature of from about 10° C. to about 40° C. for from about 1 to about 24 hours, thus giving A-homo-17α-bromoethynyl-17β-tetrahydropyranyloxy-$\Delta^{1(10),2,4a(5)}$-estratrien-4-one (XIX; R³=tetrahydropyranyl, X'=bromine).

Acid hydrolysis of the thus-obtained 17-ether, carried out in known manner, gives the free 17β-ol, e.g., A-homo-17α-chloroethynyl (or bromoethynyl)-$\Delta^{1(10),2,4a(5)}$-estratrien-17β-ol-4-one (XIX; R³=hydrogen, X'=chlorine or bromine), which can then be esterified with a mixture of an acyl anhydride and the corresponding acid in the manner described hereinabove to give the corresponding 17-esters.

In order that those skilled in the act can more fully understand the present invention, the following examples are set forth. These examples are given solely for the purpose of illustrating the invention, and should not be considered as expressing limitations unless so set forth in the appended claims.

Example I

A mixture of 5 grams of estrone 3-methyl ether, 150 cc. of anhydrous benzene, 60 cc. of ethylene glycol (previously distilled from sodium hydroxide) and 800 mg. of p-toluenesulfonic acid monohydrate was refluxed for 12 hours, using an adapter to continuously remove the water formed during the reaction. Following this reaction period the reaction mixture was cooled to room temperature and admixed with an aqueous sodium bicarbonate solution. The organic phase was then separated, washed with water, dried over anhydrous sodium sulfate and evaporated to dryness. Crystallization of the resulting residue from acetone/hexane gave 17 - cycloethylenedioxy - 3 - methoxy-$\Delta^{1,3,5(10)}$-estratriene.

Example II

A cold solution of 6 grams of 17-cycloethylenedioxy-3-methoxy-$\Delta^{1,3,5(10)}$-estratriene in 750 cc. of anhydrous diethyl ether was added, with stirring, to 900 cc. of liquid ammonia, and 7.8 grams of lithium wire were then added to the resulting solution, with stirring, over a ten minute period. Following the addition of the last of the lithium, the reaction mixture was stirred at room temperature for 20 minutes, then cautiously treated with 160 cc. of absolute ethanol. Next, after allowing the ammonia to evaporate, water was added and the ether was distilled off. The thus-obtained 17-cycloethylenedioxy-3-methoxy-$\Delta^{2,5(10)}$-esteradiene was collected by filtration, washed with water and dried.

Example III

One gram of 17-cycloethylenedioxy-3-methoxy-$\Delta^{2,5(10)}$-estradiene in 10 cc. of anhydrous benzene was added, under an inert nitrogen atmosphere, to a solution of potassium t-butoxide prepared by dissolving 0.24 gram of potassium in 20 cc. of anhydrous t-butanol, and the resulting mixture was cooled to 0° C. Next, a solution of 1.53 grams of bromoform in 5 cc. of anhydrous benzene was added over a 20 minute period, with stirring, and following this addition the reaction mixture was stirred for another hour. At this point, 100 cc. of benzene were added, and the resulting solution was washed with water until neutral, then dried over anhydrous sodium sulfate and evaporated to dryness. Crystallization of the resulting residue from benzene/ethanol gave 17-cycloethylenedioxy-2,3-dibromomethylene-3-methoxy-$\Delta^{5(10)}$-estrene.

Example IV

A solution of 500 mg. of 17-cycloethylenedioxy-2,3-dibromomethylene-3-methoxy-$\Delta^{5(10)}$-estrene in 25 cc. of acetone was admixed with 0.1 cc. of concentrated hydrochloric acid, and the resulting reaction mixture was allowed to stand at room temperature overnight. Following this reaction period the reaction mixture was poured into water and extracted with methylene dichloride. The thus-obtained extract was washed with water until neutral, then dried over anhydrous sodium sulfate and evaporated to dryness. Crystallization of the resulting residue from acetone/hexane gave 2,3-dibromomethylene-3-methoxy-$\Delta^{5(10)}$-estren-17-one.

Example V

A solution of 1.4 grams of 2.3 dibromomethylene-3-methoxy-$\Delta^{5(10)}$-estren-17-one in 200 cc. of aqueous methanol containing 4 molar equivalents of silver nitrate was refluxed for 3 hours. Following this reaction period 200 cc. of water were added, and the resulting solution was then extracted several times with benzene. The thus-obtained extracts were combined, washed with water, dried over anhydrous sodium sulfate and evaporated to dryness. Chromatography of the resulting residue on 140 grams of neutral alumina gave, in the fractions eluted with diethyl ether:benzene (10%:90%–80%:20% by volume, respectively), A-homo-$\Delta^{1(10),2,4a,5}$-estratriene-4,17-dione.

Example VI

A solution of 2 grams of sodium borohydride in 30 cc. of methanol was added, with stirring, to a solution of 2 grams of 2,3-dibromomethylene-3-methoxy-$\Delta^{5(10)}$-estren-17-one in 40 cc. of tetrahydrofuran, and the resulting reaction mixture was allowed to stand at room temperature overnight. Following this reaction period excess sodium borohydride was decomposed by the addition of acetic acid, and the resulting solution was concentrated to a small volume under reduced pressure and then diluted with water. Next, the solution was extracted with ethyl acetate and the thus obtained extract was washed with water, dried over anhydrous sodium sulfate and evaporated to dryness. Crystallization of the resulting residue from acetone/hexane gave 2,3-dibromomethylene-3-methoxy-$\Delta^{5(10)}$-estren-17$\beta$-ol.

Example VII

A solution of 5 grams of 2,3-dibromomethylene-3-methoxy-$\Delta^{5(10)}$-estren-17-one in 250 cc. of thiophene-free benzene was admixed with 27.5 cc. of a 4 N solution of methylmagnesium bromide in diethyl ether, and the resulting reaction mixture was refluxed, excluding moisture, for 3 hours. Following this reaction period the reaction mixture was cooled and cautiously treated with an excess of an aqueous ammonium chloride solution, then extracted with ethyl acetate. The thus-obtained extract was washed with water, dried over anhydrous sodium sulfate and evaporated to dryness. Recrystallization of the resulting residue from methylene dichloride/hexane gave 2,3-dibromomethylene-3-methoxy-17$\alpha$-methyl-$\Delta^{5(10)}$-estren-17$\beta$-ol.

This procedure was then repeated in every detail but one, namely, methylmagnesium bromide was replaced by equivalent amounts of vinylmagnesium bromide, trifluorovinylmagnesium bromide and ethynylmagnesium bromide, respectively. In each case, the corresponding 17$a$-substituted 17$\beta$-ol, namely, 2,3-dibromomethylene-3-methoxy-17$\alpha$-vinyl-$\Delta^{5(10)}$-estren-17$\beta$-ol, 2,3 - dibromomethylene-3-methoxy-17$\alpha$-trifluorovinyl-$\Delta^{5(10)}$-estren-17$\beta$-ol, and 2,3-dibromomethylene-17$\alpha$ - ethynyl-3-methoxy-$\Delta^{5(10)}$-estren-17$\beta$-ol, respectively, was obtained.

Example VIII

A solution of 1 gram of 2,3-dibromomethylene-3-methoxy-$\Delta^{5(10)}$-estren-17-one in 30 cc. of anhydrous benzene was added, under an inert nitrogen atmosphere, to a solution of potassium t-amylate prepared by dissolving 1.4 grams of potassium in 30 cc. of t-amyl alcohol. Next, a slow stream of purified acetylene was passed through the solution for 40 hours, following which the solution was diluted with water and extracted several times with benzene. The combined extracts were washed with water until neutral, then dried over anhydrous sodium sulfate and evaporated to dryness. Chromatography of the resulting residue on 70 grams of alkaline alumina gave, in the hexane:benzene (2:3, respectively, by volume) fractions, 2,3-dibromomethylene - 17$\alpha$ - ethynyl - 3 - methoxy-$\Delta^{5(10)}$-estren-17$\beta$-ol, identical to that prepared as described in Example VII hereinabove.

Example IX

One gram of 2,3-dibromomethylene-17$\alpha$-ethynyl-3-methoxy-$\Delta^{5(10)}$-estren-17$\beta$-ol was dissolved in 40 cc. of pyridine containing 400 mg. of pre-hydrogenated 2% palladium-on-calcium carbonate hydrogenation catalyst, and the resulting suspension was hydrogenated at room temperature and atmospheric pressure until 1.1 molar equivalents of hydrogen had been absorbed. At this point the reaction was stopped by removing the catalyst by filtration through Celite. The catalyst was then washed with ethyl acetate and these washings were added to the filtrate. The combined solution (filtrate plus washings) was then evaporated to dryness under reduced pressure. The resulting residue was dissolved in ethyl acetate and this solution was washed with dilute hydrochloric acid and then with water until neutral, then dried over anhydrous sodium sulfate and evaporated to dryness under reduced pressure. Recrystallization of the thus-obtained residue from acetone gave 2,3-dibromomethylene-3-methoxy-17$\alpha$-vinyl-$\Delta^{5(10)}$-estren-17$\beta$-ol, identical to that prepared as described in Example VII hereinabove.

Example X

A solution of 8.5 grams of 1,2-dichloroethylene in 50 cc. of anhydrous diethyl ether was added dropwise, with stirring at 0° C. over a half hour period, to 15 cc. of a 1.4 N solution of methyl lithium in anhydrous diethyl ether, maintained under an inert nitrogen atmosphere, and this mixture was then held at room temperature, with stirring, for an additional 90 minutes.

Next, a solution of 0.5 gram of 2,3-dibromomethylene-3-methoxy-$\Delta^{5(10)}$-estren-17-one in 20 cc. of anhydrous diethyl ether was added dropwise, with stirring, over a 15 minute period, following which the resulting reaction mixture was held at room temperature, with stirring, for 18 hours. Following this reaction period the reaction mixture was poured into ice water and then extracted with diethyl ether. The ether extract was then washed with water, dried over anhydrous sodium sulfate and concentrated under vacuum. Chromatography on alkaline alumina, using petroleum ether/diethyl ether (8:2, respectively, by volume) as the eluant, followed by recrystallization from methanol, gave 17α-chloroethynyl-2,3-dibromomethylene-3-methoxy-$\Delta^{5(10)}$-estren-17β-ol.

By repeating this procedure using 1,2-dibromoethylene and 1-chloro-3,3-trifluoropropyl-1-ene, respectively, in place of 1,2-dichloroethylene, the corresponding 17α-halo-lower alkynyl-17β-ols, namely, 17α-bromoethynyl-2,3 - dibromomethylene - 3 - methoxy - $\Delta^{5(10)}$ - estren-17β-ol and 2,3-dibromomethylene-17α-trifluoropropynyl-3-methoxy-$\Delta^{5(10)}$-estren-17β-ol, respectively.

Example XI

The procedure of Example V hereinabove was repeated in every detail but one, namely, 2,3-dibromomethylene-3-methoxy-$\Delta^{5(10)}$-estren-17β-ol and the corresponding 17α-substituted steroids prepared as described in Examples VII and X hereinabove were used as the steroid starting material. In each case, the corresponding A-homo steroid, namely, A-homo-$\Delta^{1(10),2,4a(5)}$-estratrien-17β-ol-4-one,
A-homo-17α-methyl-$\Delta^{1(10),2,4a(5)}$-estratrien-17β-ol-4-one,
A-homo-17α-vinyl-$\Delta^{1(10),2,4a(5)}$-estratrien-17β-ol-4-one,
A-homo-17α-trifluorovinyl-$\Delta^{1(10),2,4a(5)}$-estratrien-17β-ol-4-one,
A-homo-17α-ethynyl-$\Delta^{1(10),2,4a(5)}$-estratrien-17β-ol-4-one,
A-homo-17α-chloroethynyl-$\Delta^{1(10),2,4a(5)}$-estratrien-17β-ol-4-one,
A-homo-17α-bromoethynyl-$\Delta^{1(10),2,4a(5)}$-estratrien-17β-ol-4-one, and
A-homo-17α-trifluoropropynyl-$\Delta^{1(10),2,4a(5)}$-estratrien-17β-ol-4-one, respectively, was obtained.

Example XII

A mixture of 1 gram of A-homo-$\Delta^{1(10),2,4a(5)}$-estratrien-17β-ol-4-one, 4 cc. of pyridine and 2 cc. of acetic anhydride was allowed to stand at room temperature overnight. Following this reaction period the reaction mixture was poured into ice water and the resulting precipitate was collected by filtration, washed with water and dried. Crystallization from acetone/hexane gave A-homo-$\Delta^{1(10),2,4a(5)}$-estratrien-17β-ol-4-one 17-acetate.

By repeating this procedure using propionic anhydride, cyclopentylpropionic anhydride, caproic anhydride and enanthic anhydride, respectively, in place of acetic anhydride, the corresponding 17-propionate, -cyclopentylpropionate, -caproate and -enanthate, respectively, were obtained.

Example XIII

A mixture of 1 gram of A - homo - 17α - methyl-$\Delta^{1(10),2,4a(5)}$-estratrien-17β-ol-one, 1 gram of p-toluenesulfonic acid monohydrate, 50 cc. of acetic acid and 25 cc. of acetic anhydride was allowed to stand at room temperature for 24 hours. Following this reaction period the reaction mixture was poured into water and stirred until the excess acetic anhydride had hydrolyzed. Next, the product was isolated by extraction with methylene dichloride, and the thus-obtained extract was washed with water until neutral then dried over anhydrous sodium sulfate and evaporated to dryness. Crystallization of the resulting residue from acetone/diethyl ether gave A-homo-17α-methyl-$\Delta^{1(10),2,4a(5)}$-estratrien-17β-ol-4-one-17-acetate.

This procedure was then repeated in every detail but one, namely, A-homo-17α-methyl-$\Delta^{1(10),2,4a(5)}$-estratrien-17β-ol-4-one, was replaced by the remaining A-homo-17α-substituted-17β-ols prepared as described in Example XI hereinabove. In each case, the corresponding 17-acetate was obtained.

Similarly, by replacing the mixture of acetic acid and acetic anhydride with mixtures of propionic acid and propionic anhydride, cyclopentylpropionic acid and cyclopentylpropionic anhydride, caproic acid and caproic anhydride, and enanthic acid and enanthic anhydride, respectively, and using each of ahe A-homo-17α-substituted-17β-ols prepared as described in Example XI heseinabove, in turn, as the steroid starting material, the corresponding 17-propionates, -cyclopentylpropionates, -caproates and -enanthates, respectively, were obtained.

Example XIV

To a solution of 1 gram of A-homo-$\Delta^{1(10),2,4a(5)}$-estratrien-17β-ol-4-one in 25 cc. of benzene there was added 4 cc. of dihydropyran. Next, approximately 5 cc. of the mixture of dihydropyran and benzene was distilled off to remove moisture, and the remaining mixture was then cooled to room temperature. To the cooled mixture there was then added 0.1 gram of p-toluenesulfonic acid, and the resulting reaction mixture was held at room temperature for 72 hours. Following this reaction period the reaction mixture was washed with an aqueous 5% sodium carbonate solution and then with water until neutral, then dried over anhydrous sodium sulfate and evaporated to dryness. The resulting residue was chromatographed by passing it, dissolved in hexane, through a column of neutral alumina, thus giving A-homo-17β-tetrahydropyranyloxy-$\Delta^{1(10),2,4a(5)}$-estratrien-4-one.

By repeating this procedure in every detail but one, namely, replacing dihydropyran with dihydrofuran, the corresponding 17β-tetrahydrofuranyloxy derivative was obtained.

Similarly, by replacing A-homo-$\Delta^{1(10),2,4a(5)}$-estratrien 17β-ol-4-one with the remaining A-homo steroids prepared as described in Example XI hereinabove, and using dihydropyran and dihydrofuran, respectively, as the etherifying agent, the corresponding 17β-tetrahydropyranyloxy and -tetrahydrofuranyloxy derivatives were obtained.

Example XV 2,3 - dibromomethylene - 17α - ethynyl - 3 - methoxy-$\Delta^{5(10)}$-estren-17β-ol was reacted with dihydropyran in the manner described in Example XIV hereinabove to give 2,3 - dibromomethylene - 17α - ethynyl - 3 - methoxy-17β-tetrahydropyranyloxy-$\Delta^{5(10)}$-estrene.

A solution of 0.01 mol of this 17-tetrahydropyranyl ether in 50 ml. of of anhydrous tetrahydrofuran was admixed with a solution of 0.011 mol of ethylmagnesium bromide in 5 ml. of anhydrous diethyl ether, and the resulting reaction mixture was refluxed for 6 hours, thus giving the corresponding 17α-ethynylmagnesium bromide intermediate.

The reaction mixture was then cooled and treated under anhydrous conditions in an inert nitrogen atmosphere at 0° C. with a stream of gaseous formaldehyde (prepared by passing anhydrous nitrogen gas through a flask containing gaseous paraformaldehyde heated to 180° C. and then passing the nitrogen and entrained gaseous formaldehyde into the reaction mixture) until the reaction was complete, as evidenced by the absence of 17α-ethynylmagnesium bromide starting material on a chromatoplate containing a sample of the reaction mixture. At this point, the reaction mixture was concentrated to about one-fifth of its original volume under reduced pressure, then diluted with water and extracted with methylene dichloride. The thus-obtained extract was washed with water, then dried over anhydrous sodium sulfate and evaporated to dryness under reduced pressure. Recrystallization of the resulting residue from acetone/hexane gave 2,3-dibromomethylene-17α-hydroxypropynyl - 3 - methoxy - 17β - tretrahydropyranyloxy-Δ$^{5(10)}$-estrene.

By repeating this procedure in every detail but one, namely, adding 1 cc. of 2 N hydrochloric acid to the concentrated reaction mixture prior to diluting with water, 2,3 - dibromomethylene - 17α - hydroxypropynyl - 3-methoxy-Δ$^{5(10)}$-estren-17β-ol was obtained.

Example XVI 2,3 - dibromomethylene - 17α - hydroxypropynyl - 3-methoxy-17β-tetrahydropyranyloxy-Δ$^{5(10)}$-estrene was esterified with acetic anhydride in pyridine in the manner described in Example XII hereinabove, thus giving 17α-acetoxypropynyl - 2,3 - dibromomethylene - 3 - methoxy-17β-tetrahydropyranyloxy-Δ$^{5(10)}$-estrene.

By treating the thus-obtained 17α-acetoxypropynyl-17β-tetrahydropyranyloxy steroid with concentrated hydrochloric acid in the manner described in Example XV hereinabove, 17α - acetoxypropynyl-2,3-dibromomethylene-3-methoxy-Δ$^{5(10)}$-estren-17β-ol was obtained.

Example XVII 2,3 - dibromomethylene - 17α - hydroxypropynyl - 3-methoxy-Δ$^{5(10)}$-estren-17β-ol was esterified with a mixture of acetic acid and acetic anhydride in the presence of p-toluenesulfonic acid in the manner described in Example XIII hereinabove, thus giving 17α-acetoxypropynyl-2,3 - dibromomethylene - 3 - methoxy - Δ$^{5(10)}$ - estren-17β-ol 17-acetate.

Example XVIII

A mixture of 1 gram of 17α-acetoxypropynyl-2,3-dibromomethylene - 3 - methoxy - Δ$^{5(10)}$ - estren - 17β - ol 17-acetate, 60 cc. of methanol and a solution of 1 gram of potassium bicarbonate in 6 cc. of water was allowed to stand at 0° C. for 18 hours. Following this reaction period the reaction mixture was diluted with water and the resulting precipitate was collected by filtration, washed with water and dried. Recrystallization from acetone/hexane gave 2,3-dibromomethylene-17α-hydroxypropynyl-3-methoxy-Δ$^{5(10)}$-estren-17β-ol 17-acetate.

Example XIX

The procedure of Example V hereinabove was repeated using 2,3-dibromethylene - 17α - hydroxypropynyl-3-methoxy-Δ$^{5(10)}$-estren - 17β - ol, 2,3-dibromomethylene-17α-hydroxypropynyl-3-methoxy - 17β - tetrahydropyranyloxy-Δ$^{5(10)}$-estrene, 17α - acetoxypropynyl-2,3-dibromomethylene-3-methoxy - 17β - tetrahydropyranyloxy-Δ$^{5(10)}$-estrene, 17α - acetoxypropynyl - 2,3 - dibromomethylene - 3 - methoxy-Δ$^{5(10)}$-estren - 17β - ol, 17α - acetoxypropynyl - 2,3-dibromomethylene - 3-methoxy-Δ$^{5(10)}$-estren - 17β - ol 17-acetate, and 2,3-dibromomethylene-17α-hydroxypropynyl-3-methoxy-Δ$^{5(10)}$-estren - 17β - ol 17-acetate, respectively, as the steroid starting materials. In each case, the corresponding A-homo steroid, namely, A-homo-17α-hydroxypropynyl-Δ$^{1(10),2,4a(5)}$ - estratrien - 17β - ol - 4 - one, A-homo-17α-hydroxypropynyl - 17β - tetrahydropyranyloxy-Δ$^{1(10),2,4a(5)}$-estratrien - 4 - one, A-homo - 17α - acetoxypropynyl - 17β - tetrahydropyranyloxy-Δ$^{1(10),2,4a(5)}$-estratrien-4-one, A-homo - 17α - acetoxypropynyl-Δ$^{1(10),2,4a(5)}$-estratrien-17β-ol-4-one, A-homo - 17α - acetoxypropynyl-Δ$^{1(10),2,4a(5)}$ - estratrien - 17β - ol-4-one 17 - acetate, and A-homo - 17α - hydroxypropynyl - Δ$^{1(10),2,4a(5)}$-estratrien-17β-ol-4-one 17-acetate, respectively, was obtained.

Example XX

A mixture of 1 gram of A-homo-17α-hydroxypropynyl-Δ$^{1(10),2,4a(5)}$-estratrien-17β-ol-4-one 17-acetate, 1.5 molar equivalents of 2-chloro-1,1,2-trifluorotriethylamine and 30 cc. of anhydrous tetrahydrofuran was allowed to stand at room temperature, with stirring, for 14 hours. Following this reaction period the reaction mixture was evaporated under vacuum at room temperature, and the resulting residue was chromatographed on Fluorisil, using benzene/ethyl acetate mixtures as the eluant, thus giving A-homo - 17α - monofluoropropynyl - Δ$^{1(10),2,4a(5)}$-estratrien-17β-ol-4-one 17-acetate.

By repeating this procedure using A-homo-17α-hydroxypropynyl-17β-tetrahydropyranyloxy - Δ$^{1(10),2,4a(5)}$ - estratrien-4-one as the steroid starting material, A-homo-17α-monofluoropropynyl - 17β - tetrahydropyranyloxy - Δ$^{1(10),2,4a(5)}$-estratrien-4-one was obtained.

Example XXI

A solution of 0.17 gram of potassium hydroxide in 0.2 cc. of water and 2.5 cc. of methanol was added dropwise, with stirring, over a 30 minute period to a boiling solution of 1 gram of A-homo-17α-monofluoropropynyl-Δ$^{1(10),2,4a(5)}$-estratrien-17β-ol-4-one 17-acetate in 30 cc. of methanol, contained under an inert nitrogen atmosphere, and the resulting reaction mixture was then boiled for an additional 2 hours. Following this reaction period the reaction mixture was cooled, neutralized with acetic acid and concentrated under reduced pressure. The addition of water to the concentrate gave a precipitate which was collected by filtration, washed with water, dried and then crystallized from acetone/hexane, thus giving A-homo-17α - monofluoropropynyl - Δ$^{1(10),2,4a(5)}$ - estratrien - 17β-ol-4-one.

Example XXII

The procedure of Example IX hereinabove was repeated using A-homo-17α-monofluoropropynyl-Δ$^{1(10),2,4a(5)}$-estratrien-17β-ol-4-one and A-homo-17α-trifluoropropynyl-Δ$^{1(10),2,4a(5)}$-estratrien-17β-ol-4-one, respectively, as the steroid starting material. In each case, the corresponding 17α-fluoropropenyl steroid, namely, A-homo-17α-(3'-monofluoropropenyl) - Δ$^{1(10),2,4a(5)}$-estratrien-17β-ol-4-one and A-homo-17α-(3',3',3'-trifluoropropenyl)-Δ$^{1(10),2,4a(5)}$-estratrien-17β-ol-4-one, respectively, was obtained.

It will be obvious to those skilled in the art that other changes and variations can be made in carrying out the present invention without departing from the spirit and scope thereof as defined in the appended claims.

I claim:

1. A compound represented by the formula:

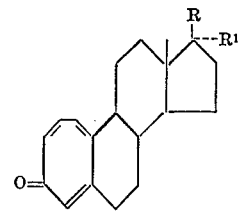

wherein R is selected from the group consisting of a hydroxyl group, a hydrocarbon carboxylic acyloxy group containing less than 12 carbon atoms, a tetrahydrofuranyloxy group and a tetrahydropyranyloxy group, R' is selected from the group consisting of hydrogen, a lower alkyl group, a lower alkenyl group and a lower alkynyl group, and R and R' taken together represent a keto group.

2. A homo-Δ$^{1(10),2,4a(5)}$-estratriene-4,17-dione.

3. A-homo-Δ$^{1(10),2,4a(5)}$-estratrien-17β-ol-4-one.

4. A hydrocarbon carboxylic acid ester of less than 12 carbon atoms of A-homo-Δ$^{1(10),2,4a(5)}$-estratrien-17β-ol-4-one.

5. A-homo-17α-methyl - Δ$^{1(10),2,4a(5)}$ - estratrien - 17β-ol-4-one.

6. A hydrocarbon carboxylic acid ester of less than 12 carbon atoms of A-homo-17α-methyl-Δ$^{1(10),2,4a(5)}$-estratrien-17β-ol-4-one.

7. A-homo-17α-vinyl - $\Delta^{1(10),2,4a(5)}$-estratrien - 17β - ol-4-one.

8. A-homo-17α-trifluorovinyl - $\Delta^{1(10),2,4a(5)}$ - estratrien-17β-ol-4-one.

9. A-homo - 17α - (3' - monofluoropropenyl)-$\Delta^{1(10),2,4a(5)}$-estratrien-17β-ol-4-one.

10. A - homo - 17α - (3',3',3' - trifluoropropenyl)-$\Delta^{1(10),2,4a(5)}$-estratrien-17β-ol-4-one.

11. A-homo - 17α - ethynyl-$\Delta^{1(10),2,4a(5)}$-estratrien-17β-ol-4-one.

12. A hydrocarbon carboxylic acid ester of less than 12 carbon atoms of A-homo-17α-ethynyl-$\Delta^{1(10),2,4a(5)}$-estratrien-17β-ol-4-one.

13. A-homo-17α-ethynyl - 17β - tetrahydropyranyloxy-$\Delta^{1(10),2,4a(5)}$-estratrien-4-one.

14. A-homo-17α-chloroethynyl - $\Delta^{1(10),2,4a(5)}$-estratrien-17β-ol-4-one.

15. A-homo-17α-bromoethynyl - $\Delta^{1(10),2,4a(5)}$-estratrien-17β-ol-4-one.

16. A - homo - 17α - monofluoropropynyl-$\Delta^{1(10),2,4a(5)}$-estratrien-17β-ol-4-one.

17. A-homo-17α-trifluoropropynyl - $\Delta^{1(10),2,4a(5)}$ - estratrien-17β-ol-4-one.

18. A-homo - 17α - hydroxypropynyl - 17β-tetrahydropyranyloxy-$\Delta^{1(10),2,4a(5)}$-estratrien-4-one.

19. A process for the preparation of an A-homo-$\Delta^{1(10),2,4a(5)}$-estratrien-4-one which comprises reacting a 2,3-dihalomethylene-3-lower alkoxy-$\Delta^{5(10)}$-estrene, in a mixture of water and a water-miscible inert organic solvent, with a water-soluble silver salt.

20. A process for the preparation of an A-homo-$\Delta^{1(10),2,4a(5)}$-estratrien-4-one which comprises reacting a 2,3-dibromomethylene-3-methoxy-$\Delta^{5(10)}$-estrene, in a mixture of water and methanol, with silver nitrate.

References Cited
UNITED STATES PATENTS

| | | | |
|---|---|---|---|
| 2,877,158 | 3/1959 | Agnello et al. | 167—65 |
| 2,929,763 | 3/1960 | Wettstein et al. | 167—65 |
| 3,083,141 | 3/1963 | Camerino et al. | 167—74 |
| 3,117,060 | 1/1964 | Bruckner et al. | 167—74 |
| 3,128,283 | 4/1964 | Pappo | 260—343.2 |
| 3,169,136 | 2/1965 | Bowers et al. | 260—397.5 |
| 3,170,923 | 2/1965 | Cross | 260—239.55 |
| 3,210,249 | 10/1965 | Beerstecher et al. | 167—74 |

OTHER REFERENCES

Johnson et al., Jour. Amer. Chem. Soc., vol. 84, p. 989 (1962).

Colton et al., Jour. Amer. Chem. Soc., vol. 79, pp. 1123–7 (1957).

Fieser and Fieser, "Steroids," Reinhold Pub. Corp., New York (1959), pp. 592–3.

Hermann et al., Experimentia, vol. 19, p. 76 (1963).

"American Drug Index," J. P. Lippincott Co., Philadelphia (1964), pp. 48, 225, 318, 467, and 636.

"The Merck Index," Merck and Co., Rahway, N.J. (1960), 7th ed., pp. 393, 394, 433, 434, 663, 1018, 1019, and 1640.

W. R. Nes, "Medicinal Chemistry" (Burger ed.) Interscience Pub., Inc., New York (1960), p. 771.

"Physicians' Desk Reference to Pharmaceutical Specialties and Biologicals," Medical Economics, Inc., Oradell, N.J. (1966), p. 600.

HENRY R. JILES, *Primary Examiner.*

J. M. FORD, *Assistant Examiner.*